United States Patent [19]
Lee et al.

[11] Patent Number: 6,058,232
[45] Date of Patent: May 2, 2000

[54] VOLUME HOLOGRAPHIC DATA STORAGE SYSTEM USING A BEAM PATTERN FROM A TAPERED OPTICAL FIBER

[75] Inventors: Byoungho Lee; Ki-Hyun Kim, both of Seoul, Rep. of Korea

[73] Assignee: Daewoo Electronics Co., Ltd., Rep. of Korea

[21] Appl. No.: 09/109,859

[22] Filed: Jul. 2, 1998

[30] Foreign Application Priority Data

Jan. 9, 1998 [KR] Rep. of Korea ............................ 98-320

[51] Int. Cl.⁷ .................................. G02B 6/26; G03H 1/00
[52] U.S. Cl. ................................... 385/39; 385/43; 385/31; 359/34
[58] Field of Search ................................. 385/39, 43, 31, 385/48; 359/34

[56] References Cited

U.S. PATENT DOCUMENTS 5,812,724  9/1998  Ohtsu et al. ............................ 385/128

OTHER PUBLICATIONS

Kang et al. "Volume Hologram scheme using optical fiber for spatial multiplexing", Optics Letters, May 1997, vol. 22, No. 10.

Ki–Hyun Kim et al., "Recording of Volume Hologram Using a Beam Pattern from Tapered Optical Fiber" IEEE Photonics Technology Letters, Dec., 1997, vol. 9, No. 12, pp. 1610–1612.

*Primary Examiner*—Cassandra Spyrou
*Assistant Examiner*—Fayez Assaf
*Attorney, Agent, or Firm*—Anderson Kill & Olick

[57] ABSTRACT

A volume holographic data storage(VHDS) system incorporates therein a tapered optical fiber for generating a speckle beam pattern from the tapered optical fiber for increasing the amount of holograms to be stored into a photorefractive crystal. The VHDS system includes a light source for generating a coherent light beam, a beam splitter for splitting the coherent light beam into a reference and a signal beams, a storage medium for storing the multiple holograms thereinto, a mirror for directing the signal beam to the storage medium, a coupler for coupling the reference beam to the tapered optical fiber, wherein one end of the tapered optical fiber has a tapered structure to give perturbation in the form of a speckle pattern to the reference beam from the tapered optical fiber and the reference beam containing the speckle pattern travels to the storage medium after being transmitted through the tapered structure, thereby the speckle pattern reference beam interfering with the signal beam in the storage medium.

9 Claims, 4 Drawing Sheets

VOLUME HOLOGRAPHIC DATA STORAGE SYSTEM USING A BEAM PATTERN FROM A TAPERED OPTICAL FIBER

FIELD OF THE INVENTION

The present invention relates to a volume holographic data storage system; and, more particularly, to an improved volume holographic data storage system using a speckle beam pattern from a tapered optical fiber for increasing the amount of holograms to be stored into a photorefractive crystal.

DESCRIPTION OF THE PRIOR ART

As is well known, demands for optically storing a large amount of data, e.g., data from a motion picture film, have been increasing. Therefore, various types of volume holographic data storage(VHDS) systems incorporating therein a storage medium have been recently developed for realizing high density optical storage capabilities, wherein the storage medium is conventionally made of lithium niobate($LiNbO_3$) or strontium barium niobate ($Sr_xBa_{1-x}Nb_2O_6$) and is used for storing the data in the form of pages.

One of the various VHDS systems is described in Y H Kang et al., "Volume hologram scheme using optical fiber for spatial multiplexing", *OPTICS LETTERS*, May 15, 1997, Vol. 22. No. 10, p. 739. The VHDS system incorporating therein a multi-mode optical fiber includes a laser for generating a light beam, a beam splitter for splitting the light beam from the laser into a signal and a reference beams, a storage medium for storing multiple holograms, a mirror for directing the signal beam to the storage medium, a coupler for launching the reference beam to the multi-mode optical fiber and a detector. In the VHDS system, the multi-mode optical fiber is incorporated therein for improving spatial selectivity for spatial multiplexing. The multi-mode optical fiber causes the reference beam to have a speckle pattern after being passed therethrough. This speckle pattern of the reference beam entails a minute correlation between itself and its shifted version, thereby storing a high density of optical information into the storage medium.

However, there is a number of problems associated with this type of system described above. First of all, the speckle pattern of the reference beam is sensitive to an external environmental change, e.g., change of temperature of the system, which may, in turn, make it difficult to read out the data stored in the storage medium.

One technique to solve the above problem is that the system utilizes a normal single-mode optical fiber in place of the multi-mode optical fiber for reducing the effect of the external environmental change. However, the beam pattern transmitted through the normal single-mode optical fiber does not show any speckle pattern. Therefore, the spatial selectivity of the VHDS system utilizing the normal single-mode optical fiber is worse than that of the VHDS system utilizing the multi-mode optical fiber, thereby reducing the amount of the data to be stored into the storage medium.

SUMMARY OF THE INVENTION

It is, therefore, a primary object of the present invention to provide an improved volume holographic storage system capable of increasing the amount of holograms to be stored into a holographic storage medium by using a speckle beam pattern from a tapered optical fiber.

In accordance with the present invention, there is provided a holographic storage system for storing a plurality of holograms incorporating therein an optical fiber, the storage system comprising: a light source for generating a coherent light beam; a beam splitter for splitting the coherent light beam into a reference and a signal beams; a storage medium for storing the plurality holograms thereinto; a mirror for directing the signal to the storage medium; a coupler for coupling the reference beam to the optical fiber, wherein one end of the optical fiber has a tapered structure to give a perturbation to the reference beam from the optical fiber and the reference beam containing a speckle pattern travels to the storage medium after being transmitted through the tapered structure so as to the speckle pattern reference beam to interfere with the signal beam in the storage medium.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
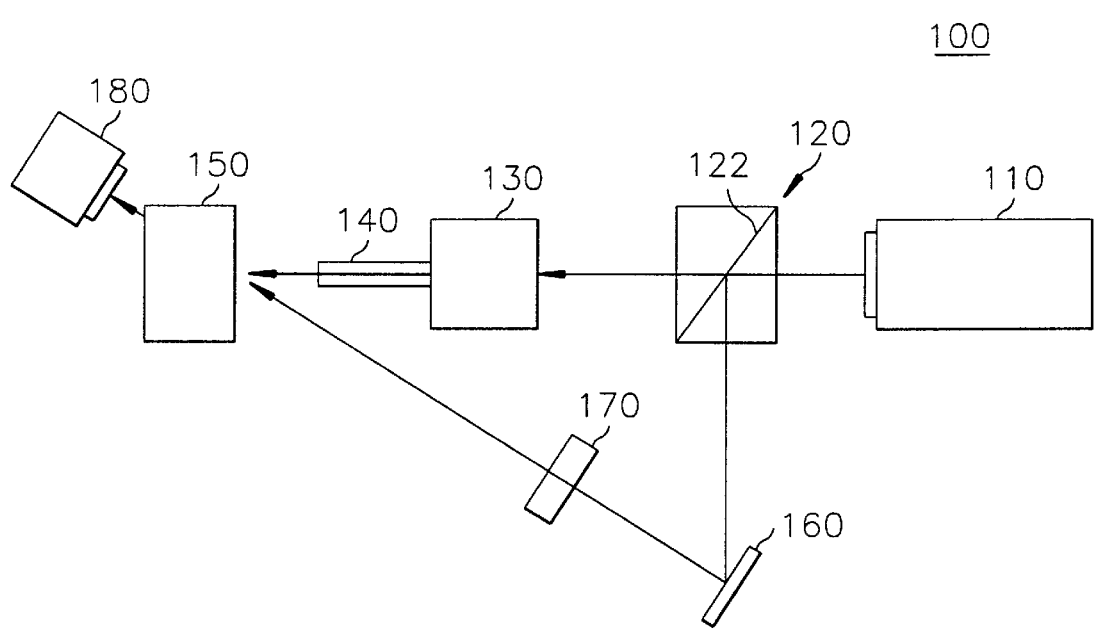
FIG. 1 represents a schematic cross-sectional view of the inventive volume holographic data storage system.

There is illustrated in FIG. 1 a schematic cross-sectional view of an inventive volume holographic data storage (VHDS) system 100 in accordance with preferred embodiments of the present invention.

The VHDS system 100 incorporated therein an inventive tapered optical fiber 140 comprises a light source 110 for generating a coherent light beam, a beam splitter 120 having a reflection surface 122, a coupler 130, a storage medium 150, a mirror 160, a SLM(spatial light modulator) 170 and a power meter 180.

In the VHDS system 100, the coherent light beam emitted from the light source 110, e.g., a He—Ne laser, travels to the reflection surface 122 of the beam splitter 120. The reflection surface 122 is capable of partially reflecting the coherent light beam to thereby split the coherent light beam into a reference beam and a signal beam, wherein the reference beam is a portion of the coherent light beam transmitted through the reflection surface 122 of the beam splitter 120 and the signal beam is a remaining portion of the coherent light beam reflected by the reflection surface 122 of the beam splitter 120. The storage medium 150 is made of a photorefractive crystal such as lithium niobate($LiNbO_3$). In the preferred embodiment of the present invention, the storage medium 150 is made of Fe-doped lithium niobate ($LiNbO_3$:Fe) crystal and is in the form of a cylinder, a rectangular cubic or a circular disk.

And then, the signal beam falls onto the mirror 160 which is capable of reflecting the signal beam to the SLM 170. In the preferred embodiment of the present invention, the SLM 170 includes discrete modulating regions, e.g., an array of M×N modulating pixels, M and N being positive integers, respectively. Each of the M×N modulating pixels is controlled by a voltage applied thereto through an integrated circuit (not shown), whereby the SLM 170 controls an amplitude and a phase of the signal beam impinged onto each of the M×N modulating pixels. Therefore, the SLM 170 is capable of converting the signal beam impinged thereonto into a modulated signal beam which contains data in the form of page after passing therethrough. The modulated signal beam is impinged onto a recording area of the storage medium 150.

On the other hand, the reference beam enters into the coupler 130 which launches the reference beam to the tapered optical fiber 140. The reference beam is arranged in such a way that it is inclined at a predetermined angle with respect to the signal beam. The tapered optical fiber 140 includes a core 142 for transmitting the reference beam and a cladding region 144 which encloses the core 142 to guide the reference beam and a tapered structure 146, wherein the tapered structure 146 gives perturbation to a light beam outputted from the tapered optical fiber 140, thereby generating a light beam having a speckle pattern, wherein the speckle pattern means that a light beam has complicated wavefronts and an intensity pattern.

The launched reference beam is transmitted through the core 142 of the tapered optical fiber 140 and travels to the tapered structure 146 formed on an outgoing end of the core 142. The outgoing end of the core 142, provided with the tapered structure 146, is in a facing relationship with the storage medium 150 and the other end of the core 142 is coupled to the coupler 130. The tapered structure 146 gives perturbation to the reference beam after being transmitted therethrough, thereby generating a speckle pattern reference beam. By utilizing the speckle pattern reference beam generated by the tapered structure 146, the VHDS system 100 of the present invention can easily be handled and the storage density is increased.

Figure 2A:
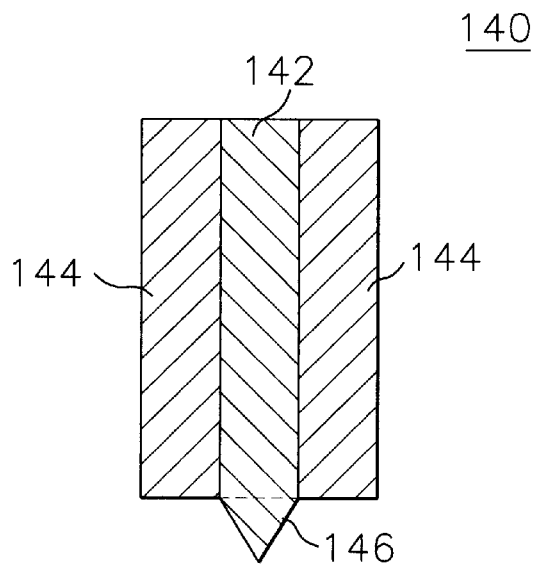
FIGS. 2A to 2D present various enlarged cross-sectional views of inventive tapered optical fibers.

Referring to FIGS. 2A to 2D, there are shown various cross-sectional views of the inventive tapered optical fibers. In FIG. 2A, there is shown a cross-sectional view of the tapered optical fiber 140 in accordance with a first preferred embodiment of the present invention. In this case, the tapered structure 146 of the tapered optical fiber 140 is in the form of a cone, wherein the core 142 and the cladding region 144 of the tapered optical fiber 140 are diameters of, e.g., 4 $\mu$m and 125 $\mu$m, respectively. The tapered structure 146 is obtained by: preparing a normal single-mode optical fiber having a core and a cladding region, wherein the core is made of a 3.6 mol % germanium doped silica and the cladding region is made of silica; and etching the outgoing end of the normal single-mode optical fiber by using a solution, wherein the solution is a mixture of HF, NH4F and DI(deionized) water. In the present invention, the outgoing end of the normal single-mode optical fiber is etched by using the solution for a period of, e.g., about 30 minutes. In the first preferred embodiment, the concentration of $NH_4F$ in the solution is more than 1.7 times those of the others. Therefore, the etching speed of the core 142 is slower than that of the cladding region 144, which will, in turn, obtain a tapered optical fiber 140 having a tapered structure 146 in the form of a cone. The tapered structure 146 has a rough surface due to the etching process.

Figure 2B:
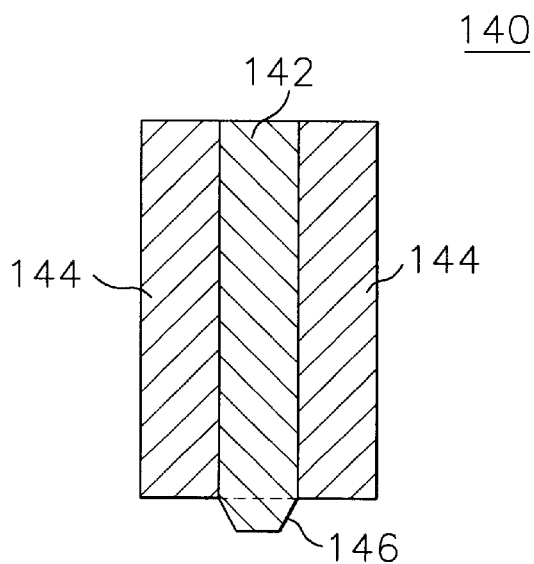

In FIG. 2B, there is shown a cross-sectional view of the tapered optical fiber 140 in accordance with another preferred embodiment of the present invention. It should be noted that the functions and structures of the tapered optical fiber 140 except the tapered structure 146 in the form of a truncated cone in FIG. 2B be similar to those for the tapered optical fiber 140 in the form of the cone as shown in FIG. 2A. In this case, the tapered structure 146 being in the form of a truncated cone is obtained by controlling the etching time of the tapered optical fiber 140.

Figure 2C:
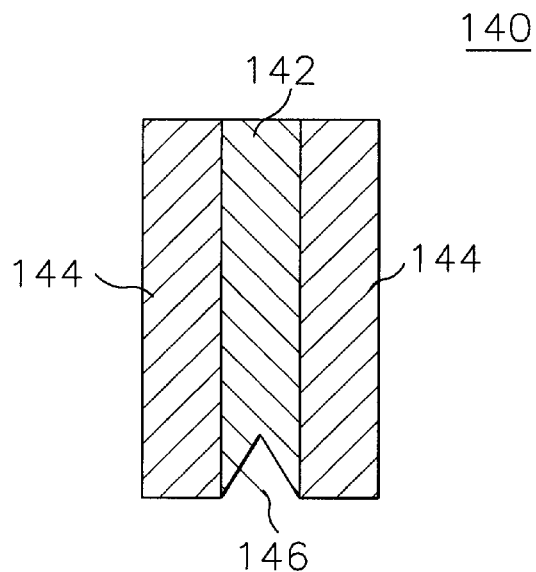
Figure 2D:
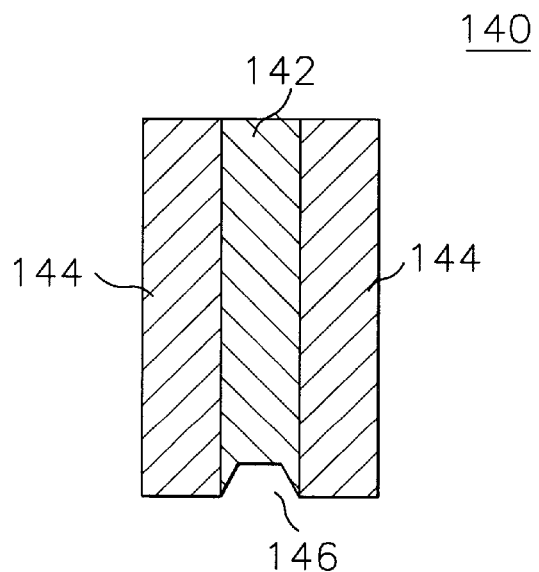

On the other hand, if the concentration of the $NH_4F$ in the solution is smaller than 1.7 times those of the other, a tapered structure 146 having the form of an inverted cone is made in the core 142 because the etching speed of the core 142 is faster than that of the cladding region 144, as shown in FIG. 2C. Further, if the etching time is smaller than that of in FIG. 2C, the tapered structure 146 will have the form of an inverted truncated cone as shown in FIG. 2D.

Referring back to FIG. 1, in the storage medium 150, the modulated signal beam interferes with the speckle pattern reference beam to thereby generate an interference pattern therebetween, wherein the interference pattern contains information of the modulated signal beam. The interference pattern is converted to an optical index pattern of the recording area of the storage medium 150 by changing the refractive index of the storage medium 150 in response to the interference pattern to thereby record the modulated signal beam into the recording area of the storage medium 150.

Thereafter, when reading the stored data, the modulated signal beam retrieved from the storage medium 150 enters the power meter 180 which is capable of detecting the power of the retrieved signal beam. The retrieved signal beam is generated by diffraction of the reference beam from the storage medium 150. It should be noted that the power meter 180 be replace by a CCD(charged coupled device) camera for detecting the power of the retrieved signal beam.

If another page of data to be modulated by the SLM 170 is recorded on a recording area of the storage medium 150, the VHDS system 100 can be multiplexed by using an angular or a spatial multiplexing.

Figure 3:
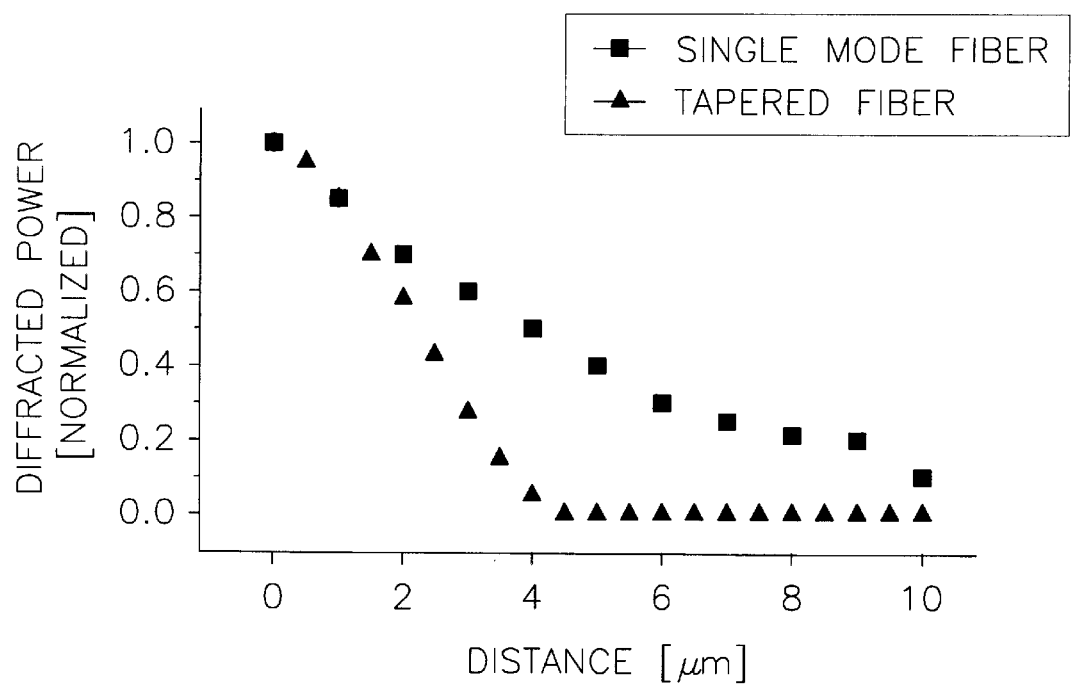
FIG. 3 depicts a graph illustrating an experimental result for comparing between a tapered optical fiber and a normal single-mode optical fiber.

FIG. 3 depicts a graph illustrating an experimental result for comparing the difference between an average readout diffracted power with the tapered optical fiber 140 with that of a normal single-mode optical fiber. A data is stored with a reference beam from a tapered optical fiber 140, and then, the data is read with the reference beam while shifting the tapered optical fiber 140 in the direction perpendicular to an optical axis, wherein the optical axis is formed by connecting a central point of the light source 110 and a center point of the tapered optical fiber 140. Comparing the HWHM (half-width at half-maximum) of the experimental curves in FIG. 3, the readout diffracted power of the tapered optical fiber 140 which is expressed as a function of a shift distance is found to decrease two times faster than that of the normal single-mode optical fiber. This effect shows that the spatial selectivity of the tapered optical fiber 140 is two times that of the normal single-mode optical fiber.

In comparison with the prior art VHDS system, the inventive VHDS system 100 is capable of recording a much larger amount of data in the storage medium. This is achieved by incorporating therein an inventive tapered optical fiber 140 having a tapered structure 146 which gives perturbation to the reference beam after being transmitted therethrough, thereby generating a reference beam having a speckle pattern. The spatial movement of a speckle pattern as well as the change of the speckle pattern for use in reading the data in the storage medium makes it uncorrelated with the speckle pattern used in writing the data into the storage medium. By utilizing the speckle pattern reference beam, the VHDS system 100 of the present invention can be easily handled and enhance the spatial multiplexing, thereby achieving a much larger storage density of the preferred embodiment of the present invention comparing with that of the prior art VHDS system.

While the present invention has been described with respect to the preferred embodiments, other modifications and variations may be made without departing from the spirit and scope of the present invention as set forth in the following claims.

What is claimed is:

1. A holographic storage system for storing multiple holograms incorporating therein a tapered single-mode optical fiber, the storage system comprising:

means for generating a coherent light beam;

means for splitting the coherent light beam into a reference and a signal beams;

a storage medium for storing the multiple holograms thereinto;

means for directing the signal beam to the storage medium; and means for coupling the reference beam to the tapered single-mode optical fiber which is provided with a core for transmitting a light beam and a cladding region for enclosing the core, wherein one end of the core has a tapered structure to introduce a perturbation in the form of a speckle pattern to the reference beam from the tapered single-mode optical fiber and the reference beam containing the speckle pattern travels to the storage medium after being transmitted through the tapered structure so as to the speckle pattern reference beam to interfere with the signal beam in the storage medium.

2. The storage system of claim 1, further comprising means for modulating the signal beam into data in the form of pages.

3. The storage system of claim 2, wherein the modulating means is placed between the storage medium and the directing means.

4. The storage system of claim 1, wherein the signal beam is arranged in such a way that it is inclined at a predetermined angle with respect to the reference beam.

5. The storage system of claim 4, wherein the optical fiber includes a core and a cladding region for enclosing the core, wherein the core transmits the reference beam substantially.

6. The storage system of claim 5, wherein the tapered structure is formed on one end of the core.

7. The storage system of claim 5, wherein the end of the core provided with the tapered structure is in a facing relationship with the storage medium.

8. The storage system of claim 5, wherein the tapered structure has the form of a cone.

9. The storage system of claim 5, wherein the tapered structure has the form of a truncated cone.

* * * * *